United States Patent [19]

O'Donnell et al.

[11] Patent Number: 4,809,184

[45] Date of Patent: Feb. 28, 1989

[54] METHOD AND APPARATUS FOR FULLY DIGITAL BEAM FORMATION IN A PHASED ARRAY COHERENT IMAGING SYSTEM

[75] Inventors: Matthew O'Donnell, Schenectady, N.Y.; Mark G. Magrane, Rancho Cordova, Calif.

[73] Assignee: General Electric Company, Schenectady, N.Y.

[21] Appl. No.: 944,482

[22] Filed: Dec. 19, 1986

Related U.S. Application Data

[63] Continuation-in-part of Ser. No. 921,516, Oct. 22, 1986, abandoned.

[51] Int. Cl.$^4$ ............................................. G01N 29/00
[52] U.S. Cl. ............................ 364/413.25; 128/660.01
[58] Field of Search ...................... 364/414; 128/660; 73/626

[56] References Cited

U.S. PATENT DOCUMENTS

| | | | |
|---|---|---|---|
| 4,155,260 | 5/1979 | Engeler et al. | 364/414 |
| 4,373,395 | 2/1983 | Borburgh et al. | 128/660 |
| 4,516,583 | 5/1985 | Richard | 128/660 |
| 4,567,897 | 2/1986 | Endo et al. | 128/660 |
| 4,604,697 | 8/1986 | Luthra et al. | 364/414 |
| 4,622,634 | 11/1986 | Fidel | 364/414 |

Primary Examiner—Jerry Smith
Assistant Examiner—Kim Thanh Tui
Attorney, Agent, or Firm—Geoffrey H. Krauss; James C. Davis, Jr.; Marvin Snyder

[57] ABSTRACT

A method for steering a beam of vibratory energy to a desired angle $\theta$ with respect to the plane of an array of transducers, uses apparatus which generates a plurality of sampling strobe sequences with each strobe pulse occurring at a time interval T after the preceding strobe pulse, where T satisfies the Nyquist condition. A different one $S_j$ of the strobe signals is assigned to each different transducer channel and the commencement time of the strobe signal in each channel is offset by a time interval which is a first positive integer multiple $M_j$, selected for each angle $\theta$, of an offset time interval which is not greater than 1/32nd of the reciprocal of the ultrasonic excitation frequency $F_u$. Each strobe signal triggers conversion of the present amplitude of the return signal directly to a digital data word; the apparatus then digitally delays each data word in each of the N channels for a delay time interval selected to cause the delayed data words from all N channels, when coherently summed, to represent any change in reflectance in the beam at the desired angle $\theta$.

23 Claims, 4 Drawing Sheets

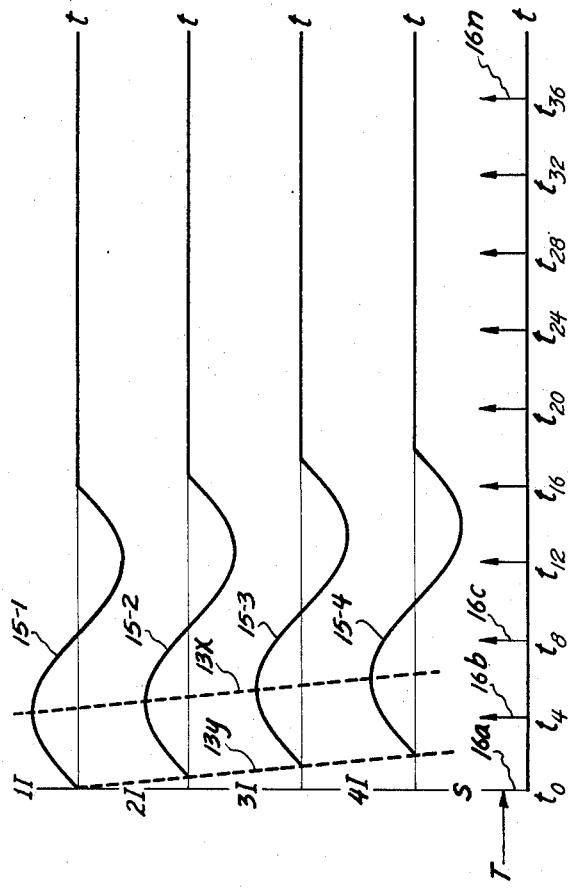
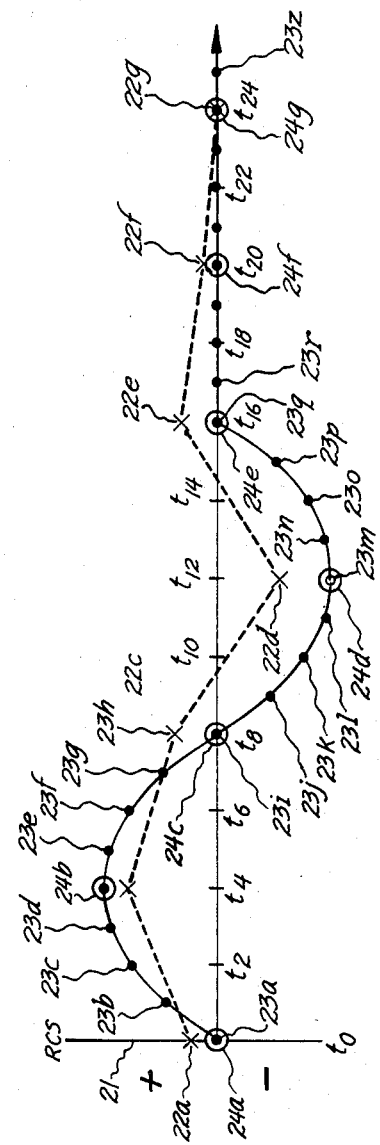
Fig. 1a (PRIOR ART)
Fig. 1b (PRIOR ART)

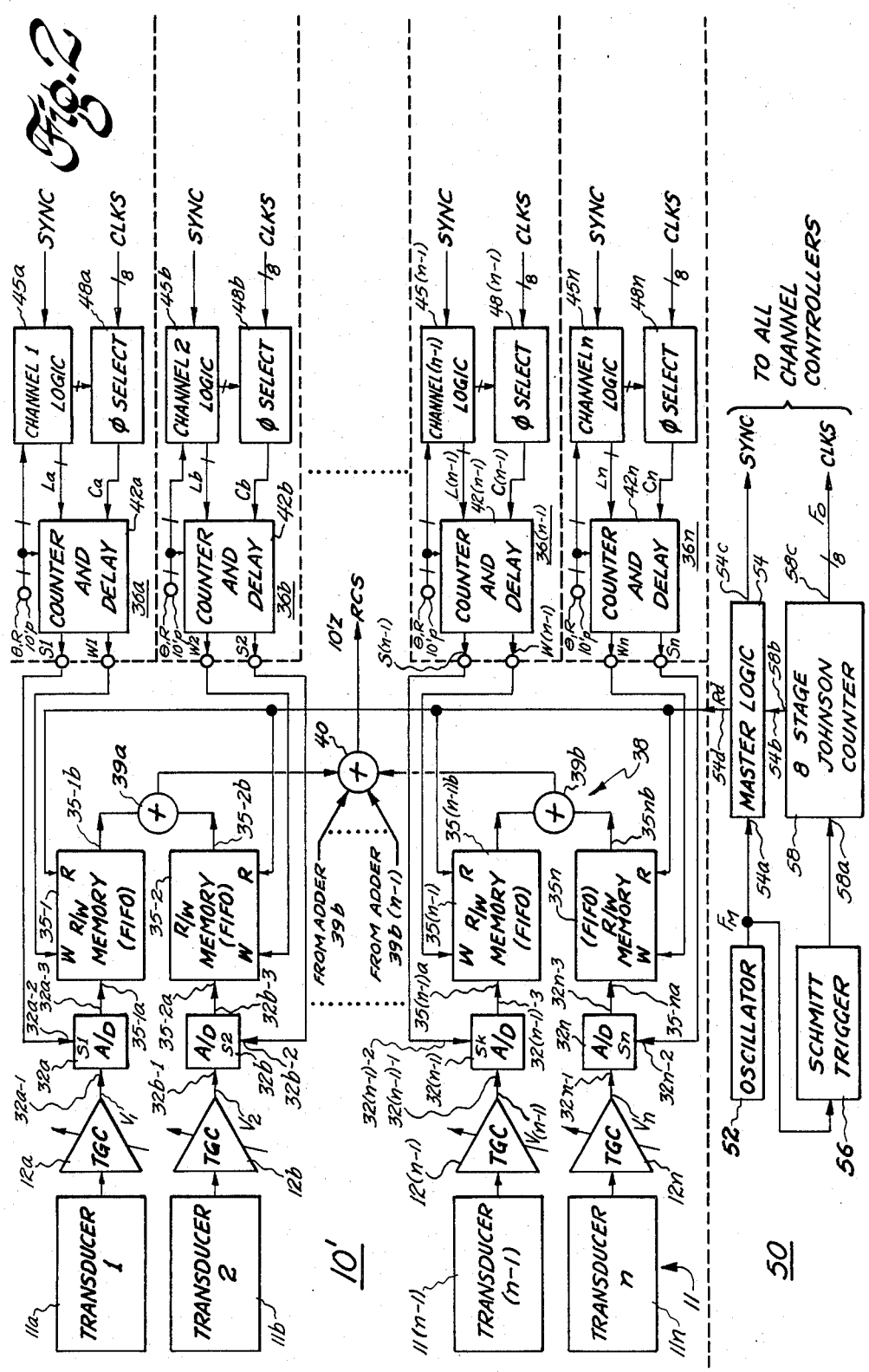

METHOD AND APPARATUS FOR FULLY DIGITAL BEAM FORMATION IN A PHASED ARRAY COHERENT IMAGING SYSTEM

This application is a continuation-in-part of U.S. patent application Ser. No. 921,516, filed on Oct. 22, 1986 and now abandoned.

BACKGROUND OF THE INVENTION

The present invention relates to coherent imaging systems using vibratory energy, such as ultrasonic or electromagnetic waves, and, more particularly, to a novel method for forming the vibratory (ultrasonic) beam, including beam direction (steering), focussing and apodization functions, totally by digital (rather than analog) signal processing of the vibratory (ultrasonic) signal.

It is now well known that ultrasonic imaging systems can provide many benefits in the various analytic arts, such as medicine and the like. A particularly beneficial form of ultrasonic imaging utilizes a phased array sector scanner (PASS) to sweep a formed beam with the greatest speed and accuracy. Originally, analog signal processing techniques were utilized to perform a coherent sum of the various signals received across the plurality N of elements in the front end of the PASS array. That is, it is well known that the accuracy of the beam formation, and particularly the pointing direction thereof, is directly related to the accuracy of the phase relationship, or time delays, between the various elements of the PASS array. It has been shown that a phase accuracy of about one part in 32 is necessary to form ultrasonic beams with enough accuracy for medical imaging applications. Therefore, each of the time delays in the PASS array must be adjustable with accuracy at least as small one-thirty second (1/32) of the time interval required for a single cycle of the imaging system fundamental frequency. For example, with an imaging system fundamental frequency of about 4.5 MHz., a time delay accuracy of about 7 nanoseconds is required. Because of this requirement, earlier systems have been somewhat replaced by systems using baseband signal processing, such as described and claimed in U.S. Pat. No. 4,155,260, issued in 1979, and application Ser. No. 794,095, filed Oct. 31, 1985 now U.S. Pat. No. 4,669,314, both assigned to the assignee of the present application and incorporated herein by reference in their entireties. The baseband processing system is such that phase accuracy and time delay accuracy are decoupled from one another, to dramatically reduce the requirements on the circuits used for beam formation. That is, the phase characteristics of the baseband demodulators are controlled so that the phase relationships between the RF signals received at the array elements are preserved after transfer to the baseband frequencies. Therefore, the demodulated signals can be coherently summed, which results in a dramatic reduction in the accuracy necessary for the time delays, which are now at the baseband (rather than RF) frequencies. However, even with baseband frequency processing, a PASS array front end is: relatively inflexible; sensitive to minor variations in the properties of analog circuits; and is relatively costly (as 2N individual analog demodulation circuits and 2N individual and complete time delay sections are required for a N channel array).

A fully digital PASS front end will allow real-time beam formation to be carried out in an accurate, flexible and cost-effective manner. While fully digital systems, such as in U.S. Pat. No. 4,324,257 and the like, were first proposed in the 1970s to attempt to overcome some of the inflexibility of analog processing, the fully digital systems described, to date, in the literature have not yet produced beams acceptable for medical imaging applications. The major problem appears to be that the time delay accuracy of such systems, being determined by the sampling rate of the analog-to-digital converter (ADC) means utilized therein, have typically been an order of magnitude less than the level of accuracy needed for medical applications, where the beam is formed of energy in the 2–5 MHz. range. That is, the ADC means in such systems have sample capabilities of between about 10 MHz. and about 20 MHz., so that resulting time delay accuracies of only between about 100 nsec. and about 150 nsec. can be obtained, rather than the desired accuracies of between about 6 nsec. and about 15 nsec.

As many other forms of vibratory energy can be used, such as coherent electromagnetic energy in ladar and radar imaging systems, as well as other types of acoustic energy systems (sonar and the like), it is desirable to provide beam forming methods and apparatus useful in any system for obtaining an image of an object by reflection of an impingent beam of vibratory energy.

BRIEF SUMMARY OF THE INVENTION

In accordance with the invention, a method for steering a beam of vibratory energy to a desired angle $\theta$ with respect to the plane of an array of a plurality N of energy transducers, each assigned to a different one of a plurality N of channels and each providing a different one $V_j$, where $1 \leq j \leq N$, of a like plurality N of returned vibratory energy signals, comprising the steps of: generating a plurality N of sequences each having a multiplicity of pulses of a sample strobe $S_j$ signal, with each strobe pulse being substantially at a time interval T after the preceding strobe pulse, where T is at least less than the reciprocal of twice the frequency $F_u$ of vibratory excitation of the transducers; assigning a different one $S_j$ of the strobe signals to each j-th channel; offsetting the commencement time of the strobe signal $S_j$ in the j-th channel sequence from the commencement times of strobe signals in all other sequences by a time interval $t_{sj}$ which is a first positive integer multiple $M_j$, selected for the each angle $\theta$, of an offset time interval $\Delta t$, where $\Delta t$ is not greater than 1/32nd of the reciprocal of the excitation frequency $F_u$; converting, responsive to the strobe signal $S_j$ sequence for that j-th channel, that one return signal $V_j$ directly to a word of digital data in an associated j-th one of a like plurality N of analog-to-digital conversion (ADC) means; and digitally delaying each data word in each of the N channel for a delay time interval $t_{dj}$ selected to cause the summed data words from all N channels to represent any change in reflectance in the energy beam at the desired angle $\theta$.

In a presently preferred embodiment of our novel method, the digital delaying step includes substeps of: causing the g-th conversion in each ADC means to occur after a time interval $t_{sj}$ following a system-conversion synchronization signal; storing each digital data word from the j-th ADC means, in order of conversion, in an associated location of a j-th one of a plurality N of memory means; after the storage time $t_{dj}$ for that channel, simultaneously reading the g-th data word from all N memory means; and summing the g-th data words simultaneously read from all of the memory means. The channel delay time interval $t_{dj}$ can be incremented by an additional amount to focus the array as the range R increases.

The foregoing invention will be described with particular emphasis to one energy form, e.g. ultrasonic mechanical vibrations, in a presently preferred embodiment; it should be understood that this energy form is exemplary and not delimiting.

Accordingly, it is an object of the present invention to provide a novel method for forming a vibratory energy beam steered to and focussed at a selected location, with respect to the plane of an array of transducers, by digital manipulation of data converted directly from received vibratory energy return signals.

It is another object of the present invention to provide novel apparatus for forming a vibratory energy beam steered to and focussed at a selected location, with respect to the plane of an array of transducers, by digital manipulation of data converted directly from received vibratory energy signals.

These and other objects of the present invention will become apparent to those skilled in the art upon reading of the following detailed description of the invention, when considered in conjunction with the appended drawings.

BRIEF DESCRIPTION OF THE DRAWINGS

FIG 1a is a set of time-related graphs of the analog signals available from a subset of the transducer array of prior-art FIG. 1 and of a set of sampling strobe signals utilized therewith;

FIG. 1b is a graph illustrating the coherent sum signal, across the array aperture, utilizing a uniform sampling function 2, as shown in FIG. 1a, and also of the coherent sum signal utilizing non-uniform direct sampling of the baseband signal;

FIG. 2 is a schematic block diagram illustrating the structure of the front end signal and logic means, and the associated portions of a main logic means, of one presently preferred embodiment of apparatus utilizing the method of the present invention.

DETAILED DESCRIPTION OF THE INVENTION

Figure 1:
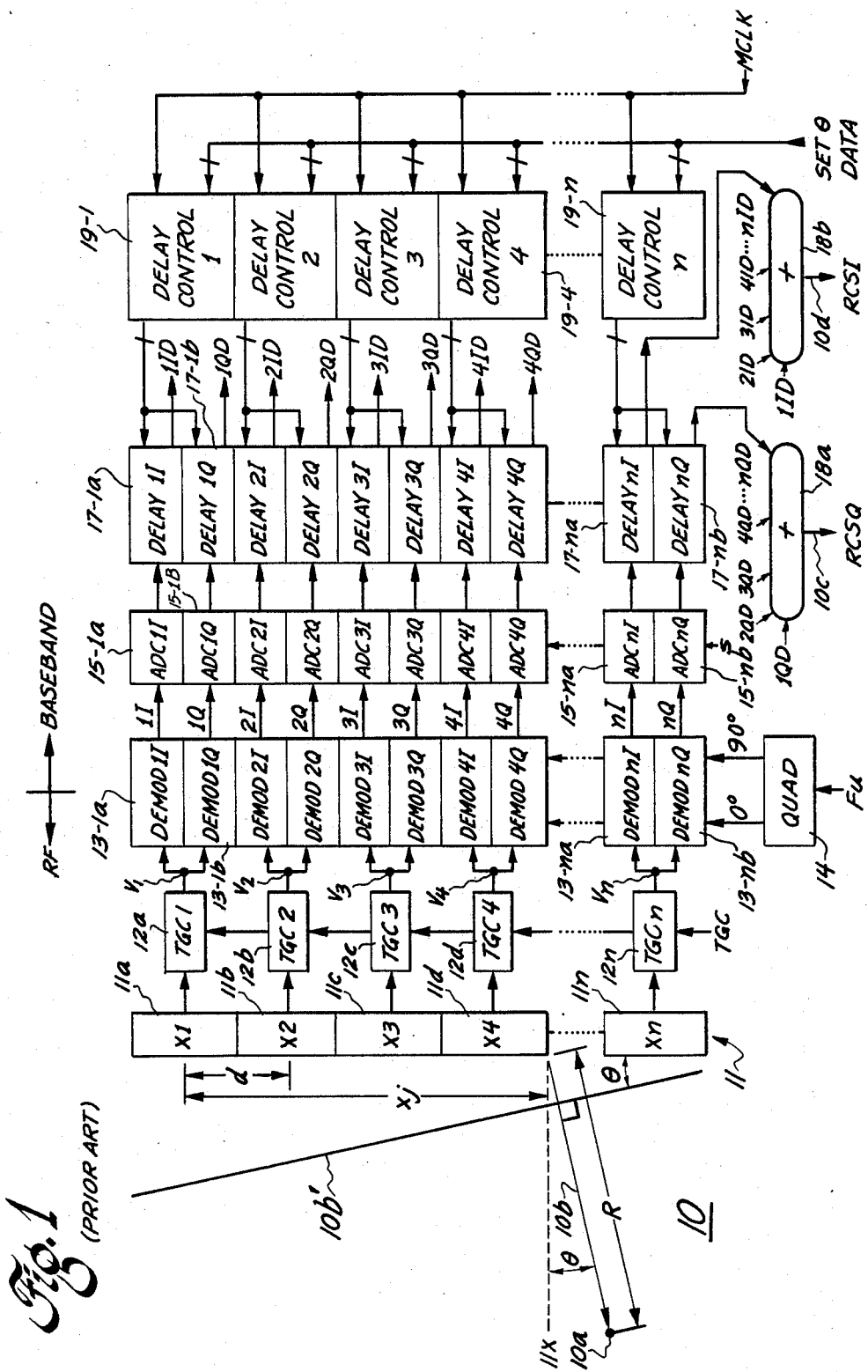
FIG. 1 is a schematic block diagram of the front end of a prior-art PASS vibratory energy (ultrasonic) imaging system.

Referring initially to FIGS. 1, 1a and 1b, in a prior art phased array sector scanning (PASS) vibratory energy (e.g. ultrasonic) imaging system 10, a front-end transducer array 11 is comprised of a plurality N of individual transducers 11-1 through 11-n, each operating, in a transmission condition, to convert electrical energy of a radio-frequency signal to a desired (e.g. ultrasonic mechanical) form of vibratory energy and, in a reception condition, to convert reflected (ultrasonic) vibrations to a received RF analog electrical signal, in manner well known to the art. Other forms of energy, such as electromagnetic energy (light, radio, etc.) and the like, can be equally as well utilized. The array is utilized for imaging a spatial location 10a which is at a range distance R along a line 10b at some angle $\theta$ with respect to a line 11x normal to the plane of array 11. The vibratory (ultrasonic) signal reflected from point 10a has a wavefront 10b' approaching the plane of array 11 at angle $\theta$. The analog electrical signals produced at each output of an associated one of the transducers X1–X$n$ is amplified in one of time-gain controlled amplifier means 12a–12n, with gain responsive to the amplitude of a TGC control signal, and is demodulated to a pair of quadrature analog signals jI and jQ, where $1 \leq j \leq n$, in an associated pair of demodulation means 13-1a, 13-2a, ..., 13-na and 13-1b, 13-2b, ..., 13-nb, responsive to a pair of quadrature local oscillator signals provided at the ultrasonic frequency Fu from a quadrature means 14. Each analog signal in the baseband quadrature signal pairs 1I/1Q, 2I/2Q, ..., nI/nQ is individually sampled and the amplitude thereof converted to a digital data word in an associated analog-to-digital conversion means 15-1a through 15-na or 15-1b through 15-nb. Each conversion data word, formed responsive to one of a multiplicity of sequential strobe S signal pulses 16a, 16b, ..., 16n, is then time delayed in an associated one of delay means 17-1a through 17-na or 17-1b through 17-nb. All conversion data words are individually delayed, by a delay time established by an associated one of delay control means 19-j (for that channel j) and thus provides both a delayed baseband I signal jId to a first summer means 18a, and a delayed baseband Q signal jQd to a second summer means 18b. The resulting coherent sum (RCS) in-phase signal RCSI, at output 10c, and quadration-phase RCSQ, at output 10d, can be operated upon to extract the amplitude of the return signal from only those objects along the line 10b at the angle $\theta$ selected by establishing the channel delays $t_{dj}$ in accordance with the formula $t_{dj} = (j-1)(d/V)\sin\theta$, where V is the velocity of ultrasound propagation in the media immediately adjacent the transducers 11 and d is the spacing distance between adjacent transducers in the array.

As seen in FIG. 1a, it is well known that the baseband analog signals (e.g. signals 15-1 through 15-4, for the first four in-phase I channels 1I-4I), as provided to the ADC means, will have the maxima and minima thereof varying, in the time domain, with relationship (as shown by maxima line 13x and minima line 13y) which are determined by the spatial steering angle $\theta$, and with a spacing therebetween determined by the half-wavelength of the vibratory (ultrasonic) frequency utilized. If the sector scanning system 10 is utilizing a uniform sampling function S, in which all analog signals are sampled essentially simultaneously, responsive to each sample strobe signal 16 (with any one sample strobe separated from the adjacent sample strobe by a substantially-constant fixed time interval T, which is the reciprocal of the ADC operating frequency and at least twice the baseband frequency, but not in excess of the ADC maximum frequency) and the digitized data from each transducer is then time delayed, in manner known to the art, then the resulting coherent sum (RCS) signals will only roughly approximately that required signal waveform. This can be seen in FIG. 1b, wherein time is plotted with increasing value along abscissa 20 and the RCS amplitude is plotted with increasing value along ordinate 21. The amplitude of the resulting coherent sum signal, summed across the array, exists as one of a plurality of sample values, each indicated by one of X points 22a, 22b, ... 22g, ..., but only at temporal points (e.g. times $t_0$, $t_4$, $t_8$, $t_{12}$, $t_{16}$, $t_{20}$, $t_{24}$, ... ) which are separated from one another by the substantially constant sampling time interval T. It will seen that the resulting coherent sum signal 22 is not particularly accurate, when compared to the ideal signal curve 23. As taught in the aforementioned application, more accurate coherent sum signals, as indicated by the RCS amplitude points 24a, 24b, ... 24g (shown by the larger circles along the curve 24 of FIG. 1b) result if the baseband signals are non-uniformly sampled.

In accordance with one principle of the present invention, the RF energy response signals (e.g. after TGC preamplifiers 12) are directly sampled, without conversion to baseband. Each j-th one of the N analog-to-digital (ADC) converters, which digitizes the RF analog signal Vj from an associated j-th one of the N transducers of the array, is sequentially enabled with a sampling strobe Sj signal that is offset from the strobe of the previous channel by some integer multiple of an aperture commencement offset, or resolution, time interval $\Delta t$. This offset time interval is selected to be not greater than a thirty-second (1/32) of the reciprocal of the vibratory (ultrasonic) RF frequency $F_u$. Therefore, the offset time interval is substantially independent of the interstrobe time-interval T, established by the Nyquist frequency. In the simplest embodiment, each ADC receives a sequential train of sampling pulses which are themselves all spaced by the sampling time interval T apart, with the train of sampling strobe signals between each pair of adjacent ADCs, in adjacent channels, being "time-slipped" by some integer multiple $M_j$ of the $\Delta t$ time interval therebetween. The multiplier $M_j$ can be selected for each j-th channel in the same manner that the channel excitation delay is selected (e.g. for any angle $\theta$ and with a known $\Delta t$, $M_j=(j-1)(d/V\{t\} \sin \theta)$).

Figure 1C:
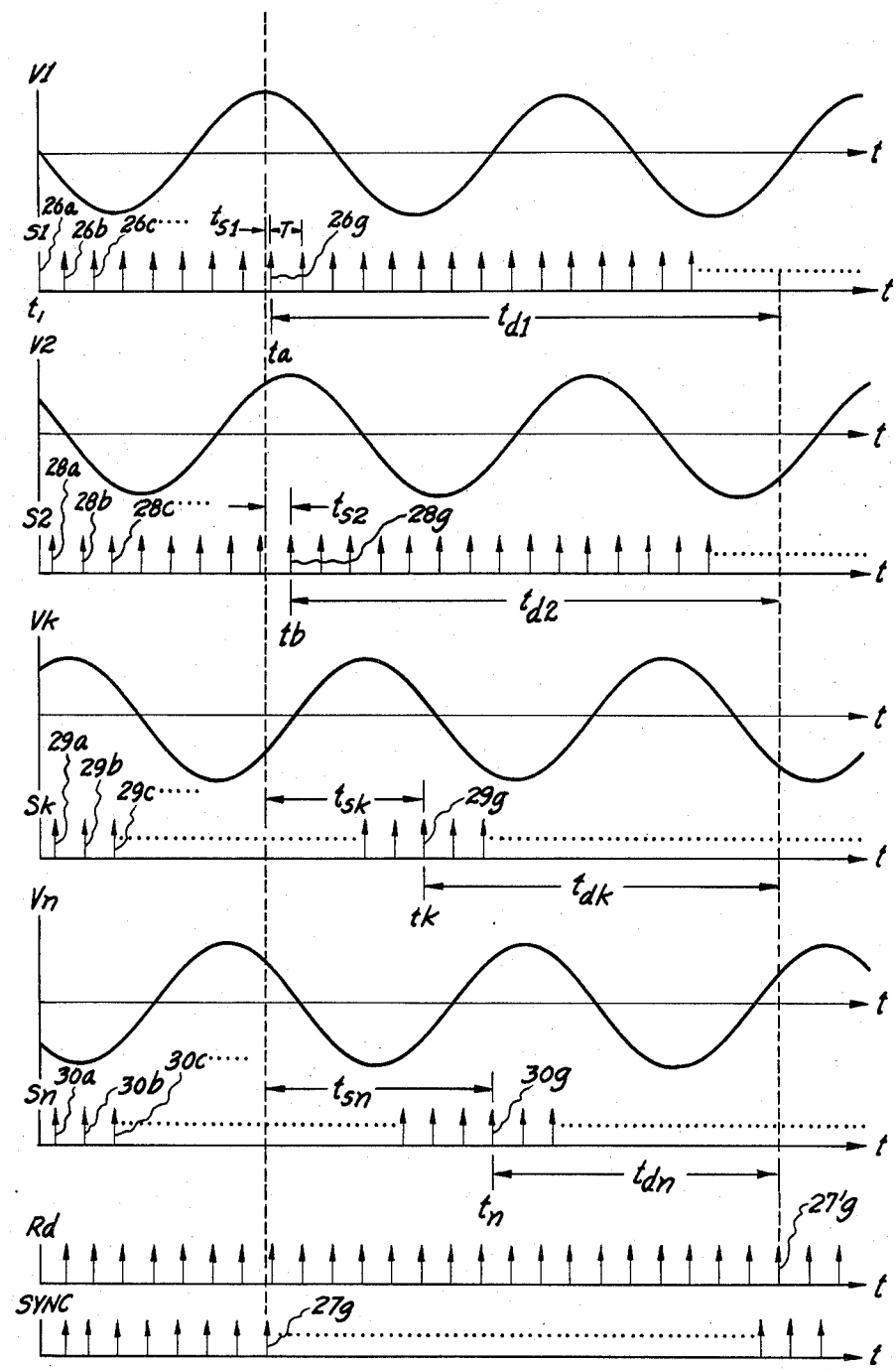
FIG. 1c is another set of time-coordinated graphs illustrating non-uniform sampling for RF channel time delay operation, with the method of the present invention.

The method for direct non-uniform sampling of the transducer array RF signal is illustrated in FIG. 1c. For purposes of illustration, only four of the N transducers are shown; the conversion sample strobe Sj signal, for each of the four channels (where j=1, 2, ... k, ..., n), has sequential strobe signal pulses separated by the strobe sample interval T, but with the channel strobe for a particular reading, in the strobe sequence of any channel, being separated by the channel offset time interval $M_j\cdot\Delta t$ from the strobe for the correspondingly numbered reading for an adjacent channel. The offset time interval $\Delta t$ is itself set from a system-wide master clock signal, so that resolution is substantially equal in all channels. It should be understood that the offset time interval $\Delta t$ will best be an integer submultiple of the interstrobe time interval T; this allows the events in all of the plurality of channels to be established at multiples of a system-wide clock period, relative to one system-wide synchronization event. Illustratively, a synchronization signal 27g will be provided at some time well prior to the earliest one of the N sampling strobe signals in each sample-taking set. A number of master clock pulses can be counted to establish the time interval $t_{S1}$ until that time when, for a particular set of one reading per channel, a first channel strobe pulse 26g occurs in the signal S1 for sampling the first RF channel signal V1 for the g-th reading set; this occurs, for example, at time $t_a$. Even though the first channel ADC means strobe signal S1 comprises a train of sequential strobe pulse signals 26a, 26b, 26c, ..., 26g, ... having the basic sampling interval T between each pair thereof, the exact time at which a particular one of the strobe pulses, e.g. pulses 26g, occurs, is set by establishing an initial time-slip interval $t_{Sj}$ after some synchronization event (generally connected with the excitation sequence for that beam angle $\theta$ then in use). For example, in a system having 20 MHz. sampling, the strobe time interval $T=(1/20\times 10^6)=50$ nanoseconds. For each set of readings, the strobe signal for the j-th channel occurs with a channel sample time interval $t_{Sj}$ after a system synchronization pulse 27; that is, each set contains one conversion of data from each ADC means in a then-active channel. Thus, a SYNC pulse 27g occurs to signal either the start of a first one of a plurality of sets of events (say, the first of 200 sets of sequential conversions in each channel, after one excitation) or the start of each set of events (with each individual set of events being one conversion of the RF ultrasonic analog signal amplitude). In general, each successive channel has a larger channel sample time interval $tS_j$ than that of the previous channel, if $\theta$ is negative (as defined in FIG. 1) and clockwise with respect to normal 11x; the direction of change of this initial channel delay is reversed if $\theta$ is reversed, i.e. if $\theta$ is positive and counter-clockwise (on the opposite side) or normal 11x.

If, for example, a SYNC pulse 27 precedes each set of channel readings, then for the first channel, the after-sync. delay interval $t_{S1}$ $(=M_1\cdot\Delta t)$ must elapse before the first channel strobe pulse 26g occurs to call for the data conversion for the one channel 1 conversion in the g-th reading set. Strobe signal S2, to the ADC means in the second channel, is a sequence of strobe pulses 28a, 28b, ..., 28g, ... each spaced at substantially the same time interval T from the adjacent signal pulses of the second channel sequence. In the illustrated case where the SYNC. pulse precedes each reading set, the g-th strobe pulse 28g of this sequence occurs at a channel after-sync. (or sample) time interval $t_{S2}=(M_2\cdot\Delta t)$ from the associated SYNC. signal pulse 27g used as the start time in that g-th set. reference. In The k-th channel strobe Sk signal has the pulses 29a, 29b, ..., 28g, ... thereof spaced with substantially the same interval T therebetween, but with the exact time $t_k$ of the g-th set data reading pulse 29g occurring at a channel sample time interval $t_{Sk}$, equal to $M_k\cdot\Delta t$, after the associated SYNC pulse 27g. Likewise, the last channel n has strobe pulses 30a, 30b, ..., 30g, ... with substantially the same time interval T therebetween, but with an n-th channel sample time interval $t_{Sn}=M_n\cdot\Delta t$ occurring for sample pulse 27g with respect to the SYNC. pulse 27g for that particular set of readings. Reiterating, a synchronization pulse 27g occurs for a g-th set of readings, comprised of one conversion in each channel, with the actual channel sample strobe signals 26g, 28g, ..., 29g, ..., 30g (in the first, second, ..., k-th, ... and n-th channels, respectively) occurring with respective channel sample time intervals $t_{S1}, t_{S2}, ..., t_{Sk}, ..., t_{Sn}$ after than SYNC. pulse 27g. The duration of each sample time interval is $M_j\cdot\Delta t$, where $M_j$ is determined by the beam steering angle $\theta$, the array characteristics (e.g. spacing distance d), the velocity V of propagation of the medium adjacent to the array, etc. and can be taken from a look-up table and the like, or calculated, as desired. Each sample time interval is set with a resolution of $\Delta t$ and can be adjusted, or "slipped", in either direction, to cause the conversion strobe for that reading set and channel to be within the nearest resolution interval for the set of conversions required to form a beam at the desired angle $\theta$.

Utilizing the novel non-uniform-sampling-at-RF method, it will seen that each analog-to-digital conversion means need be capable of sampling the received "return" vibratory energy (ultrasonic) signal at a rate which may be as low as the Nyquist rate (although the sample rate is usually several times greater), as long as the "aperture jitter", or sample initiation resolution, time is less than the desired submultiple (here, a factor of 32) of the intersample time interval T, so as to achieve the necessary phase accuracy. Thus, any ADC means with at least a 9 MHz. sampling speed and with a sample strobe aperture uncertainty of less than about 6 nanoseconds, can be utilized for an ultrasonic system front end in which a 4.5 MHz. excitation frequency is used.

Again referring to FIG. 1c, it will be seen that the converted data word in the j-th channel is then time delayed by a channel delay time $t_{dj}$. This delay time is individually established for each individual j-th channel, by another integer multiple $L_j$ of offset interval $\Delta t$. Thus, any channel time delay (or delay sequence) can be produced if the sampling function for each channel element is controlled independently. That is, the sampling function for any given element of the ultrasonic array will be identical to the phasing schedule for the same channel element in a conventional baseband phased array sector scanning system (such as that in the previously cited U.S. Pat. No. 4,155,260). Therefore, a channel time delay can indeed be provided independent of the sampling time for that channel, and responsive only to the array parameter j and the steering angle $\theta$ (and the range R, if auto-focus is to be performed). For example, the first channel time delay $t_{d1}$ is the interval between a particular channel 1 sample strobe for a given set of channel readings, e.g. strobe 26g for the g-th set, and the next all-channel delay termination, or data-read, $R_d$ signal 27'g at which all N data words in that g-th data set are simultaneously made available for forming the RCS for that set. The various channel delay time intervals $t_{dj}$, where each is the time from the associated strobe pulse (e.g. pulses 26g, 28g, 29g, ..., 30g for the first, second, ..., k-th, ..., n-th channels) to the all-channel read pulse, are each resoluble to time interval $\Delta t$. It will be understood that dynamic apodization is easily accomplished by initially sampling only that plurality $P_{min}$ of channels, where $P \leq N$, then needed in the array (with the $P_{min}$ channels placed symmetrically about the center of the array) for focussing the beam at nearer points on steering line 10b; additional symmetrically disposed pairs of channels will be enabled as needed for focussing at points with greater range R. As the range increases the delay time interval $td_p$ will be "bumped", or changed (by integer multiples $P_p$ of the offset interval $\Delta t$), to accommodate changes in the time delay. It will be seen that the sum of the channel times is constant, e.g. $t_{sj} + t_{dj} = k$ (the time between any SYNC. pulse 27g and the read pulse 27' for that g-th set of data readings).

Referring now to FIG. 2, a presently preferred embodiment of our novel phased array sector scanner front end 10' has a transducer array 11 with a plurality N of channel transducers 11a–11n. Even if apodization is used, some centrally-disposed minimum number $P_{min}$ of these transducers are always excited. The circuitry for exciting the transducers to produce a vibratory energy signal is well known and is not illustrated, for purpose of simplicity. For purposes of illustration, N may be 64.

The received "return" signal output from each transducer is operated upon by an associated time-dependent gain-controlled preamplifier/amplifier (TGC) means 12. Thus, the analog signal output from first transducer 11a is amplified by TGC means 12a, while second channel transducer 11b has its analog output signal amplified by TGC means 12b, and so forth. The gain of all channels is set by a common TGC control signal (not shown). In accordance with the invention, the amplified RF signal in each channel is directly applied, without frequency conversion or demodulation, to the analog input 32i-1 of that one of a plurality N of ADC means 32 for that i-th channel, where $1 \leq i \leq N$. It will be immediately apparent that this apparatus needs no local oscillator signal generator, no mixer/demodulators and only N (rather than 2N) ADC means and delay means, relative to the AD-conversion-at-baseband front end of FIG. 1. In each of the N channels, one digitization is carried out responsive to the application of an individual strobe signal Si pulse at the conversion-enable input 38i-2 of the associated ADC; each ADC is independently storable, with respect to all other ADC means 32. Responsive to each strobe pulse, a word of output data is provided at a parallel data output port 38-i3. Advantageously, each of the ADC means is substantially identical to any other one of the ADC means and will have an offset timing (conversion initiation) accuracy of less than 7 nsec. and will allow analog signal amplitude to be converted to digital data at about 20 megasamples per second. Illustratively, each of ADC means 32 can digitize the input analog ultrasonic signal to an output data word with 7 bits of accuracy, giving the front end and instantaneous dynamic range of greater than 48 dB.

The ADC output data word is provided to the data input port 35-ia of the associated one of a plurality N of first-in-first-out (FIFO) channel read/write (R/W) memory means 35i, each of which is used to establish the time delay $t_{dj}$ for the associated one of the channels. The input data is written into the memory responsive to a memory write strobe Wi signal pulse at a memory write W input; this write pulse occurs slightly after each associated strobe Si pulse (the delay being established to account for the finite conversion time required for the data to appear at the ADC output after the stobe S pulse is received). The stored data is subsequently provided at the memory means output port 35-ib responsive to a memory read strobe signal $R_d$ pulse at the memory means read R input. The memory read R inputs of all of the N FIFO memory means are connected in parallel, so that all of the stored single channel data readings of a set are read out essentially simultaneously, even though each j-th channel data word is input to the j-th channel memory individually and in a sequence determined by the non-uniform sampling strobe signal sequence (which is itself determined by channel number and angle). Thus, each memory means must have a minimum storage capacity SCmin, or depth, at least equal to the number of data words which can be provided in the time interval $(t_{Si} + t_{di})$ interval between the SYNC. pulse 27g and the associated read $R_d$ pulse 27'g; thus, SCmin = $(t_{Si} + t_{di})/T$. Since the total time interval $(t_{Si} + t_{di})$ and strobe time interval T are predetermined constants, the minimum storage capacity of each memory is also preselectable. The address port (not shown) of the memories can, because of their FIFO mode of operation, be of cyclic style, with the address being changed by each SYNC. strobe, write or the like pulse. The individual channel sample strobe S signal and memory write Wi signal (which follows thereafter by at least the ADC means conversion time interval) are provided by an associated one of a plurality N of individual channel logic means 36i.

The output data words from all channel memory means 35i are added to one another in a combiner means 38 to realize the RCS output signal at front end output 10'z. Combiner means 38 may be a "tree" of adders, such as adders 39 and 40. It is desirable to have an even number N of transducer channels, whereby a plurality K of 2-input adder means $39a, \ldots, 39k$ (where $K=N/2$) are used with at least one further level of means 40 for combining the outputs of the combining means 39, to provide the final output data at output $10'z$. If a binary number N of channels are used, where $N=2$ exp C (C being an integer, e.g., $C=6$ for $N=64$), then only two-input combiners, e.g. six levels of two-input combiners 39-40, can be used in a symmetrical pattern. Such "trees" may have simplifying influence upon the masks necessary to provide in a single integrated semiconductor circuit the data memory and data-combining means for a multichannel front-end, or portion thereof. Advantageously, the digital circuitry of associated channel 15 logic means 36 will be implemented upon the same I.C.

The channel logic means $36i$ for each associated front-end channel i, whether of integrated, discrete or other form, comprises a counter and delay means $42i$ for providing the sample $S_i$ and write $W_i$ signal pulses, responsive to a channel selected clock phase $C_i$ signal and channel logic $L_i$ signals. The logic $L_i$ signals are provided by an i-th channel logic means $45i$, responsive to a stored sequence of information (i.e. operating instructions) of which each sequential step is carried out responsive to some combination of clock pulses after each synchronization SYNC signal received; the exact instructional sequence can, if desired, be modified, responsive to values of $\theta$ and/or R provided to the front end $10'$ via an information port $10'p$, from a system central computer means and the like (not shown). In either case, the instructional sequence uses the value of beam steering angle $\theta$ to set both the delay interval $t_{di}$ and the sample interval $t_{si}$ for the associated channel. The channel logic means $45i$ provides data to a channel phase $\phi$ select means $48i$ to select a specific one of the plurality Q of different clocks CLKS signal phases as the channel clock phase. Each channel $\phi$ select means $48i$ also receives a plurality Q of different phases of a high frequency clock CLKS signal. Data for determining which phase, number of master clock cycle delay, and similar characteristics of the clock $C_i$ and logic $L_i$ signals, as necessary for each i-th channel and dependent upon the value of $\theta$ and/or values of R, as well as channel delay data, can be obtained in any of the plethora of fashions well known to the art (e.g. look-up tables, down-loading from a central processor, etc.)

The SYNC and CLKS signals are provided by a master control means 50, having a stable oscillator means 52 to provide a master clock signal at a predetermined frequency $F_M$ (e.g. 200 MHz.). The master clock signal is provided to one input $54a$ of a master logic means 54. The master clock signal is squared-up by a Schmitt-trigger means 56. The trigger output signal (a substantially square wave at frequency $F_M$) is applied to the input $58a$ of a multiple-stage Johnson counter means 58. The master logic means has another input $54b$ which is provided from a first output $58b$ of the counter means with a clock pulse related to the master clock signal, e.g. can be as often as one clock pulse for every clock half-cycle time interval. The Johnson counter also provides, at its second outputs $58c$, the plurality Q of separate signals, each pulsing to a chosen level only once in every Q cycles of the master oscillator frequency $F_M$. Thus, if $Q=8$, these eight clock CLKS signals are each separately and mutually-exclusively pulsed at a frequency of $F_M/Q=25$ MHz. Master logic means 54 provides, inter alia: a series of the synchronization injection SYNC signals, at a first output $54c$, to initiate the strobe pulse/memory-write/delay sequence in the various channels; and the system common read $R_d$ signal pulse, at a second output $54d$, to commonly end each conversion/write/delay-till-read cycle of each front end channel.

Referring now to FIGS. 1c and 2, in operation of PASS front end $10'$, SYNC pulses occur only after termination of each transmission excitation to the transducers of array 11; some additional delay may be added to allow for settling time and other effects. Thus, an initial interval of some preselected time, e.g. about 2 microseconds, may be required after termination of excitation and before the analog output of the first transducer of the array $11a$ is converted to a digital data word. If the oscillator 52 master clock frequency $F_M$ is 200 MHz., this requires 400 master clock pulses. Thus, the first transducer sample time interval $t_{S1}$ (between the synchronization pulse of any set, e.g., the g-th set SYNC pulse $27g$, and the first channel strobe S1 pulse for that same set, e.g. the g-th set strobe $26g$) is illustratively selected to be at least 2 microseconds long. This same "dead time" interval will be utilized at the start at each of the sample time intervals $t_{Sj}$ for each of the N transducer channels. As all stored data for a particular set is to be read simultaneously, responsive to a common read $R_d$ pulse $27'g$, the time interval between the synchronization pulse $27g$ and the read pulse $27'g$, for that particular reading set, is constant, such that the variable delay time interval $t_{dj}$ for each channel is subtracted therefrom to arrive at the sample time $t_{Sj}$ at which the strobe must occur after the synchronization pulse. For purposes of illustration, it will be assumed that the array has parameters such that $(d/V)=1$ microsecond so that the delay time interval $t_{di}=(i-1)\sin\theta$ microseconds. For the particular angle $\theta=-30°$, i.e. $\theta$ is an angle of 30° clockwise with respect to the array normal (as defined in FIG. 1), the delay time interval for the i-th channel will be $(t_{di},=0.5(i-1)$ microseconds). The maximum delay interval $(t_{di}+t_{Si})$ is selected to allow the shortest channel delay, here $t_{dn}$, to still be sufficiently long for all necessary timing to occur. The channel delay time interval $t_{di}$ will decrease and the channel synchronization-strobe delay $t_{Si}$ will increase, as the channel number i increases.

The angle $\theta$ data is received at front end data port $10'p$ prior to any SYNC. pulse 27. Now, after the g-th reading set synchronization pulse $27g$ occurs, the channel one logic means $45a$ provides logic information signals $L_a$ to counter and delay means $42a$, and provides phase select data to the select means $48a$, to select the proper one of the eight master clock phases to supply as the first channel clock $C_a$ signal to counter and delay means $42a$. This clock phase, after being counted for a number of occurrences established by the data of one of signals $L_a$, causes the first channel strobe signal S1 pulse $26g$ to occur at time $t_a$. Illustratively, with the first strobe time interval $t_{S1}$ being equal to 2.000 microseconds (the initial 2 microsecond dead time plus 0 additional strobe delay time for the first array channel, with $i=1$), the first channel logic means $45a$ will have calculated that: (a) the multiple $M_1=400$ master clock cycles need be counted, with the first phase of the CLKS signal being utilized for clock signal $C_a$; and (b) that the $M_1/Q=50$th occurrence of clock signal $C_a$, after the synchronization signal, should cause the first strobe S1 pulse $26g$ to be present at the first channel ADC means $32a$. The associated channel memory write signal, e.g.

first channel write signal W1, occurs not later than the next clock Ca pulse after the strobe; this delay can be set (by use of gate delays, counting of master clock pulses, or the like) to be at least the duration of the conversion time and less than the time to occurrence of the next strobe $S_i$ for that channel. Thereafter, the first channel delay time $t_{d1} = t_d$ max (illustratively preselected to be 35 μsec.), so that the sum $(t_{di} + t_{Si})$ is constant at 37 μsec (taking 7400 master clock cycles). The general formulae are: $t_{di} = (35-(i-1)/2)$ microseconds; and $t_{Si} = (2+(i-1)/2)$ microseconds. Thus, delay interval $t_{d1} = 35μ$ (equivalent to 7000 master clock cycles), as $t_{S1}$ was previously selected as 2 μsec (400 clock cycles). For the second channel, with i=2, $t_{d1} = 35 - \frac{1}{2} = 34.5$ μsec. (or 6900 clock cycles), and $t_{S1} = 37 - 34.5 = 2.5$ μsec (or 500 clock cycles) to be counted in second channel counter and delay means 42b. In the last (N=64) channel, $t_{d64} = 35 - 63/2 = 3.5$ μsec (or 700 clock cycles) and $t_{S64} = 37 - 3.5$ μsec. (or 6700 clock cycles). When 7400 master clock cycles have been counted (in master clock means 54) after the SYNC. pulse 27g, the g-th set all-channel memory read-out pulse 27'g is provided. It will be seen that dynamic focus time slippage can be easily implemented, given entry of range R information, by an appropriate increase in any channel's delay interval $t_{di}$ (where the increase is $(t)_{focus} = (a^2/2RV)(1-(x_i/a)^2) \cos^2\theta$, with $x_i$ being the distance from the array center to the center of the i-th transducer, and a being the maximum $x_i$ distance for that array). Small changes in time delay due to dynamic focus effects can be easily implemented by changing the clock phase, selected by the associated select means 48, as a function of range R. A similar decrease will occur in time interval $t_{Si}$.

While only certain preferred features of the invention have been shown by way of illustration, many modifications and changes will occur to those skilled in the art. For example, the RF return signal(s) can be frequency-converted to an intermediate (IF) frequency prior to conversion to digital data; we still consider the signals to be at an RF frequency, rather than at baseband frequencies. It is to be understood that the appended claims are intended to cover all such modifications and changes as fall within the true spirit and scope of the invention.

What we claim is:

1. A method for steering a beam of vibratory energy, at an excitation frequency $F_u$, to a desired angle θ with respect to the normal to the plane of an array of a plurality N of transducers, each assigned to a different j-th one of a plurality N of channels, where $1 \leq j \leq N$, comprising the steps of:

(a) generating for each j-th channel a different sample strobe $S_j$ signal sequence having a multiplicity of sequential pulses, with any pair of pulses of that channel strobe sequence having substantially a time interval T therebetween, where T is at least less than the reciprocal of twice the excitation frequency $F_u$;

(b) offsetting, from the occurrence of each of a sequential set of synchronization signal pulses, a commencement time of a next pulse of the strobe $S_j$ signal sequence in the j-th channel essentially by a sample time interval $t_{Sj}$ which is a first positive integer channel multiple $M_j$, selected for each angle θ, of an offset time interval Δt, where Δt is less than T and is a fixed fraction of the reciprocal of the excitation frequency $F_u$;

(c) maintaining all strobe $S_j$ signal pulses, after the offset next pulse, with substantially the time interval T therebetween until another offsetting step occurs;

(d) converting, responsive to each pulse of the strobe $S_j$ signal sequence, a j-th channel return signal $V_j$ directly to a word of digital data representing a present amplitude of the return signal in that j-th channel;

(e) digital delaying each data word in each of the N channels for a channel delay time interval $t_{dj}$ which is a second positive integer channel multiple $P_j$, selected for each angle θ, of the offset time interval Δt; and (f) coherently summing responsive to a signal at a substantially fixed time interval after each synchronization signal, each delayed data word then simultaneously available from all N channels, to obtain each point of data representing a reflectance of the energy beam at the desired angle θ.

2. The method of claim 1, wherein step (d) includes the step of providing an associated j-th one of a like plurality N of analog-to-digital conversion (ADC) means in which the conversion of the $V_j$ signal occurs responsive to each strobe $S_j$ signal pulse; and step (e) includes the steps of: (e1) sequentially storing each sequential digital data word from the j-th ADC means, in order of conversion, in an associated location of a j-th one of a plurality N of memory means; (e2) after the delay interval $t_{dj}$ for that channel, sequentially reading one data word from each of the N delayed memory means; and (e3) summing all of the N data words substantially simultaneously read from all of the N memory means to obtain the reflectance data.

3. The method of claim 2, wherein there are an even number N of channels, and step (e3) includes the steps of: (e3a) substantially simultaneously summing each one of N/2 different pairs of delayed data words to obtain a first-level summed data word; and (e3b) then substantially summing all of the N/2 resulting first-level summed data words.

4. The method of claim 3, wherein $N = 2^C$, where C is a positive integer greater than 1, and step (e3b) includes the steps of: further summing, at each of (C-1) additional levels, each different pair of summed data words resulting from a previous summing level, to arrive at a single final data word sum.

5. The method of claim 2, wherein step (e2) further includes the step of providing a single system-wide read $R_d$ signal having a multiplicity of pulses, each for causing each of the N memory means to output one stored data word.

6. The method of claim 5, wherein step (e2) further includes the step of causing each pulse of the read $R_d$ signal to occur at a fixed time interval after the occurrence of an associated one of the synchronization signal pulses.

7. The method of claim 6, wherein step (e2) further includes the step of setting the fixed time interval to be not less than $(t_{Sj} + t_{dj})$.

8. The method of claim 2, wherein step (e1) includes the step of providing a memory write $W_j$ signal to the j-th memory means, during a time interval, less than the time interval T, after each conversion strobe pulse in that j-th channel, to cause storage of the data word then presented to that memory means from the associated j-th channel ADC means.

9. The method of claim 1, wherein step (b) includes the step of selecting the fixed fraction to be not greater than 1/32.

10. The method of claim 1, wherein step (b) includes the step of selecting the fixed fraction to be equal to $2^{-x}$, wherein the integer x is at least 5.

11. The method of claim 1, wherein step (b) includes the step of adjusting the offset commencement time of at least one sample time interval $t_{Sj}$ by another integer multiple of offset time interval $\Delta t$ to dynamically focus the beam with changes in range R.

12. The apparatus of claim 1, wherein the vibratory engery is ultrasonic energy.

13. Front-end receiving apparatus for a coherent imaging system having a sector-scanning phased array of a plurality N of transducers, each different one in a different j-th channel, wherein $1 \leq j \leq N$, and providing a received signal, at a vibratory energy excitation frequency $F_u$, of a amplitude responsive to the reflectance of media at a range R and a steering angle $\theta$ with respect to the array normal, comprising:

each j-th different one of a plurality N of analog-to-digital converter (ADC) means for directly converting the instantaneous amplitude of a j-th channel RF frequency signal $F_j$ to a digital data word responsive to each pulse of a strobe $S_j$ signal for that j-th channel;

each different j-th one of a plurality N of FIFO memory means for storing, responsive to each pulse of a j-th channel write $W_j$ signal, and for presenting, in FIFO order, a next sequential stored data word responsive to each pulse of a read $R_d$ signal;

each different j-th one of a plurality N of channel logic means for independently generating both (a) the j-th channel strobe $S_j$ signal, with a multiplicity of sequential pulses each separated from the adjacent pulses by a time interval T, where T is at least less than the reciprocal of twice the transducer excitation frequency $F_u$, and with a next strobe pulse, after each of a plurality of synchronization signal pulses, being offset from that associated synchronization signal pulse by a time interval $t_{Sj}$ which is a first positive integer channel multiple $M_j$, selected for each channel and each angle $\theta$, of an offset time interval $\Delta t$, where $\Delta t$ is less than T and is a fixed fraction of the reciprocal of the excitation frequency $F_u$, but with all strobe $S_j$ signal pulses, after that next offset strobe pulse, being maintained with substantially the time interval T therebetween until another synchronization pulse occurs; and (b) the j-th channel write $W_j$ signal at a time after each strobe pulse and prior to a next sequential strobe pulse for that j-th channel;

master logic means for generating each of a sequence of said read $R_d$ signal pulses at a time to cause each of the plurality N of presented stored data words to have been delayed in storage by a time interval $t_{dj}$ which is a second positive integer multiple $P_j$, also selected for each channel and each angle $\theta$, of the offset time interval $\Delta t$; and means for combining the data of all N data words substantially simultaneously presented at the N memory means, responsive to each read $R_d$ signal pulse, to output a word of coherently summated data from the front end.

14. The apparatus of claim 13, where N is even and said combining means includes a plurality N/2 of means each for combining the data words output from two different ones of said N memory means.

15. The apparatus of claim 14, wherein $N=2^C$, where C is a positive integer greater than 1, and said combining means further comprises a binary tree formation of (C−1) additional levels of means for combining two different ones of data words output from the combining means of the immediately higher level; with an output data word from the single combining means of a lowest (C-th) level being the front-end output data word.

16. The apparatus of claim 13, wherein the fixed fraction is selected to be not greater than 1/32.

17. The apparatus of claim 13, wherein the fixed fraction is selected to be equal to $2^{-x}$, where the integer x is at least 5.

18. The apparatus of claim 13, wherein the master logic means comprises means for poviding a plurality of clock signals, each at a different phase of the same frequency; and each of the N channel logic means comprises means for selecting one of the plurality of clock signal phases and for counting each cycle occurrence thereon for generating each strobe $S_j$ signal for that j-th channel.

19. The apparatus of claim 18, wherein the master logic means further comprises means for providing each synchronization signal at a time interval, prior to each read $R_d$ signal pulse, substantially equal to a selected constant for each particular angle $\theta$.

20. The apparatus of claim 13, wherein each j-th channel logic means includes means for providing, responsive to externally-provided angle $\theta$ data, values of the multiples $M_j$ and $P_j$.

21. The apparatus of claim 20, wherein each j-th channel logic means also receives externally-provided range R data; and further comprises means for varying a selected sample clock phase to cause the then-active channels of the front-end to be correctly dynamically focussed with varying range.

22. The apparatus of claim 13, wherein said master logic means includes means for controlling the time at which at least one pair of the channels are enabled to actively participate in the array, to use dynamic apodization to reduce error when the range R is less than a preselected distance.

23. The apparatus of claim 13, wherein the vibrating energy is ultrasonic energy.

* * * * *